UNITED STATES PATENT OFFICE.

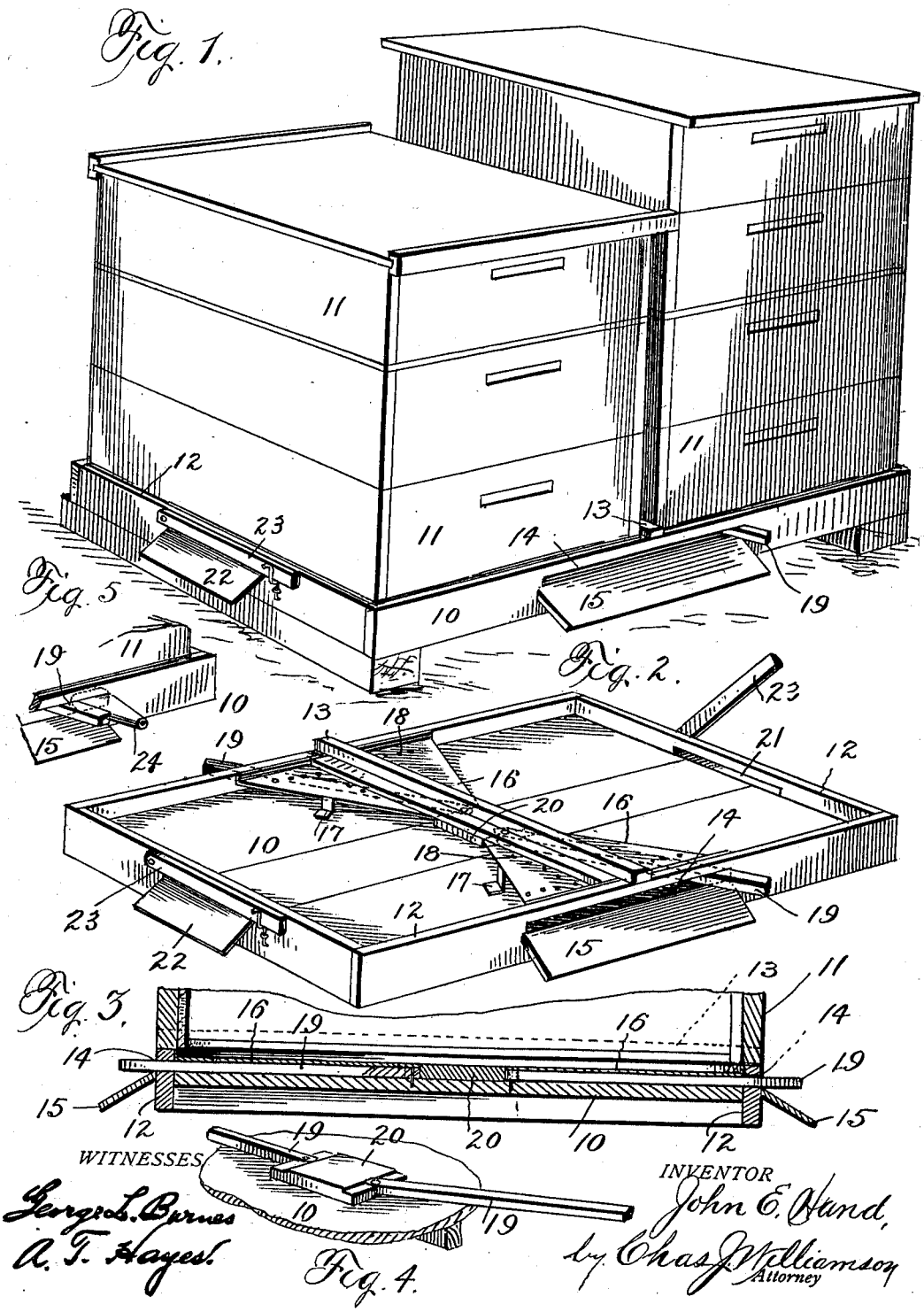

JOHN E. HAND, OF BIRMINGHAM, OHIO.

BEE-CONTROLLING MEANS.

993,060.  Specification of Letters Patent. Patented May 23, 1911.

Application filed February 15, 1911. Serial No. 608,712.

*To all whom it may concern:*

Be it known that I, JOHN E. HAND, of Birmingham, in the county of Erie, and in the State of Ohio, have invented a certain new and useful Improvement in Bee-Controlling Means, and do hereby declare that the following is a full, clear, and exact description thereof.

A serious problem in bee culture on a commercial basis is the control of the bees so as to prevent or break up their natural tendency to swarm. Efforts heretofore made in this direction have comprised such expedients as clipping the wings of queens, shaking and brushing bees, interchanging hives and brood chambers, etc., all of which involve disadvantageous or objectionable features out of proportion to the results secured.

The object of my invention is to enable the control of bees, primarily for the purpose of preventing swarming, but also for other purposes, to be accomplished without employment of any special construction of hive, so that hives of ordinary construction may be used; with a minimum amount of work in handling or manipulating the hives; by means of apparatus of inexpensive cost to manufacture and requiring but little effort to operate; and which will involve no conflict or interference with the habits and instincts of the bees, but which, indeed, takes into account these factors, for the success of my invention turns upon fitting the apparatus in accordance with the natural behavior of the bees, and performing such manipulations or operations as are necessary in harmony with the habits of the bees.

In the accompanying drawings—Figure 1 is a perspective view of an embodiment of my invention; Fig. 2 a similar view of my double bottom board; Fig. 3 a vertical section thereof from front to rear; Fig. 4 a detail view in perspective showing more clearly the switch levers; and Fig. 5 a detail view in perspective showing the manner of using a bee escape.

The casting of a swarm by a colony of bees is the result of an overcrowded condition in the hive which the bees themselves seek to remedy by the departure from the hive of the excess bees. If at the time of the development of these conditions, the excess bees, or the bees that are making swarming preparations, are transferred to another hive, in which conditions for causing swarming do not exist, the swarming flight can be prevented and the swarming impulse destroyed.

In carrying my invention in practice, I provide for shifting bees from one hive to another. As it is now known that bees become accustomed to a particular hive and to its location, as well as the position of the hive entrance, and any disturbance of the hive in respect of these matters is productive of trouble to the bees on their return to the hive from a nectar gathering flight. Taking into account the considerations mentioned, I provide a bottom board 10 adapted to support two hives side by side of ordinary construction, which consist of bottomless bodies 11, some being brood chambers and others supers containing the usual brood or extractor frames and honey section holders for comb honey. The bottom board, of course, is oblong in form and at each of its four sides has an upwardly extending rim or flange 12 upon which the bottom edge of the lowermost hive body 11 is set, and at its transverse center extending from front to back is a strip or cleat 13 against the sides of which the inner sides of the two lowermost hive bodies 11 are positioned. On the central portion of the rim or flange on each long side of the bottom board there is an entrance opening or passage 14 that extends the same distance on both sides of the transverse center of the bottom board, and hence, constitutes what, in effect is a common opening into both hives so that the flying bees coming to either hive will find a familiar location and appearance and thus, as far as reaching the entrance is concerned, will be involved in no confusion or difficulty whatever, and thus may be led or directed without trouble into one or the other at the will of the operator, all as hereinafter more fully described. A suitable alighting board 15 is shown at each opening 14. The reason for the duplication of the openings 14 is hereinafter explained.

Each passage way 14 opens under a V- shaped or triangular plate or partition 16 that extends horizontally inward with its apex toward the center of the bottom board, and said plate or partition extends equidistant on opposite sides of the transverse center of the bottom board and, therefore, direct access to one corner portion of each hive at the bottom is prevented. Hence, bees must pass beneath said plate or partition in coming into and going out of the hive. The plates or partitions 16 are attached to the underside of the cleat or strip 13 and have upturned flanges contiguous to the bottom board flanges or rims 11 by which they are attached to said rims or flanges, and each plate or partition at each inclined side may be provided with a foot 17 to support it from the top surface of the bottom board.

For the purpose of ventilation, holes 18 are provided in the plates or partitions. Beneath each partition plate 16, and at or near the apex thereof, is pivoted a simple rod or bar 19 that thence extends out through the opening of passage 14 where it projects a short distance outside the latter so that it may be readily grasped by the fingers and swung horizontally from end to end of said opening. Vertically said bar is thick enough to close the space between the top of the bottom board and the underside of the partition plate 16 so that when said bar is swung to its limit of motion in one direction it closes communication between one hive and said opening while leaving communication between the other hive and said opening absolutely unobstructed, while when moved to the other limit of its motion it will reverse the described condition as to the two hives. The bar 19, it will thus be seen, forms a gate or switch lever by which at will and by the most simple operation, communication between one hive and out doors may be shut off and the other hive and out doors opened so that all flying bees whether belonging to one hive or the other may be caused to enter but one hive. The space beneath the division cleat 12 between the pivot ends of the two switch levers is closed by a filling block 20. At each side of the bottom board in the rim or flange thereat, is provided an auxiliary hive entrance or opening 21 with a suitable alighting board 22 for the control of which is provided a hinged bar 23 that may be swung into and out of closing position. The purpose of these auxiliary extrances, each of which, as will be evident, communicates with but one hive, is explained hereinafter.

The system of procedure which I pursue for the control of bees in accordance with my invention is as follows: Upon the existence of conditions in one of the hives which would result in swarming, one of the switch levers is moved to the position to close the entrance to that hive so that flying bees which are outside the hive at that time on returning will enter the other hive. It will be understood that in connection with the manipulation of the switch lever there will be an interchange of the bodies of the two hives. Thus the top story with its extracting or brood combs is taken from the hive in which there is, or may be a tendency to swarm, (for convenience I will refer to it as hive No. 1) and placed on the other side of the bottom board to make the other hive, which, for convenience, it will be termed hive No. 2, and a super of comb honey sections is placed thereon with a queen excluder between the same and the extracting or brood combs beneath. As the switch lever is moved to close access by flying bees to hive No. 1, and to open access to hive No. 2, which contains the brood frames and supers previously in hive No. 1, the flying bees will go on storing honey in the same set of supers on which they had worked in hive No. 1, and as there is a great deal of honey in the extracting or brood combs transferred to hive No. 2, and very little brood therein, the honey will be removed by the bees to the comb in the supers to make room for the queen to lay for new brood. If conditions develop in hive No. 2 inciting to swarm, its flying bees and its supers are switched back to hive No. 1, but ordinarily one shift is all that is required to break up the swarming fever and supers are added to hive No. 2 as may be required to receive surplus honey. The entrance to hive No. 1 having been closed by one of the switch levers, the other switch lever is moved so as to close the entrance of the other side of the bottom board to hive No. 2, and to open hive No. 1 so that the bees remaining therein may have an outlet and entrance. When the brood in hive No. 1 develop and there is a goodly force of young bees flying from the new opening thus provided, said young bees can be made to reinforce the colony in hive No. 2, simply by again shifting the second switch lever so as to close the entrance to hive No. 1 and open the second entrance to hive No. 2, which thus will have openings on both sides. Under this condition both entrances or openings to hive No. 1 controlled by the switch levers will be closed and thus the departure and return of bees still left in hive No. 1 thereby prevented. It is for this situation that I provide the auxiliary end entrance which is now opened. When there is a second shift, or switching back of the bees to No. 1, the auxiliary entrance is closed, because otherwise bees becoming accustomed to the use of that opening would not be under the control of the switch lever. Where increase is desired, however, the auxiliary entrance, after the second shift, would be left open so that there would be three entrances whose combined capacity would be large to suit the requirements of a spring colony, this being an important factor in solving the problem of swarm control. After the first shift all that is required to control swarming is to throw the switch levers once in eight or ten days and to transfer the supers from one hive to the other, and as the hives are very close together the labor of transferring is very slight and the operation can be performed without the workman moving from his place. In the shifting that is done the first time, the queen is carried from hive No. 1 to hive No. 2, and hence if increase is desired it is necessary to supply hive No. 1 with a queen. The removal of the bees remaining in hive No. 1, including the flying bees as well as those that subsequently hatch when they arrive at the flying age, may be automatically effected by placing a bee escape 24 in the entrance or opening of hive No. 1 between the switch lever and the edge of the opening by which the return of bees to hive No. 1 will be prevented and their addition to the swarm or colony of hive No. 2 effected.

By my invention the prevention of the infection of healthy bees by foul brood and other contagious diseases, and the eradication of such diseases may be thoroughly and automatically accomplished, because, as will be evident, the return of bees to an infected hive can be prevented and the bees compelled to enter and use a healthy hive.

As will be evident, my invention is predicated upon a careful study and knowledge of the habits of characteristics of bees, and for that reason, as no conditions are imposed that run counter to the habits or instincts of the bees, the object sought is accomplished, and it is accomplished by a minimum of labor, which, of course, is of vital importance in the commercial exploitation of bees. Inasmuch as my invention involves no alteration in the hive structure, the customary appliances, such as feeders, etc., may, as usual, be employed.

Having thus described my invention what I claim is—

1. The combination of independent hives, a part having an entrance common to said hives, and means for closing communication between said entrances and one hive at a time.

2. The combination of independent hives, a part having an entrance common to both hives, and a device simultaneously closing communication between one hive and said entrance and opening communication between the other hive and said entrance.

3. The combination of independent hives, a bottom board common to said hives, an opening being provided in said bottom board adapted to communicate with both hives, and means for controlling the communication between said hives and said opening.

4. The combination of independent hives, a bottom board common to said hives, an opening being provided in said bottom board adapted to communicate with both hives, and means for controlling the communication between said hives and said opening consisting of a bar pivotally mounted on the bottom board and protruding through said opening.

5. The combination of independent hives, a bottom board common to both hives, an opening being provided for said bottom board adapted to communicate with both hives, means for controlling the communication between said hives and said opening, consisting of a bar pivotally mounted on the bottom board and protruding through said opening, and a plate lying above said bar and covering an area coextensive with its range of movement.

6. The combination of independent hives, a part having two entrances each common to said hives, and means for closing communication between each of said entrances and one hive at a time.

7. The combination of independent hives, a part having an entrance common to said hives, means for closing communication between said entrances and one hive at a time, and an auxiliary independent entrance for each hive.

8. The combination of independent hives, a double hive bottom having on opposite sides an entrance common to both hives, means for closing communication between one of the hives and each of said entrances, and an independent auxiliary entrance for each hive.

9. The combination of independent hives, a double hive bottom having on opposite sides, an entrance common to both hives, a bar pivoted at its inner end to said bottom board for each of said entrances outside of which said bar protrudes, and a horizontal plate lying over each of said pivoted bars and covering the space traversed thereby in its range of movement.

10. A bottom board for bee hives having an upwardly extending flange or rim on each of its four sides, bars pivoted at their ends to said bottom board and extending in opposite directions from their pivots passing, respectively, through openings in two of said rims, said bars being located at the transverse center of said bottom board, a cleat extending between said rims at the transverse center of said board, and plates lying above said pivoted bars.

11. A bottom board for bee hives having an upwardly extending flange or rim on each of its four sides, bars pivoted at their ends and said bottom board and extending in opposite directions from their pivots passing respectively through openings in two of said rims, said bars being located at the transverse center of said bottom board, a cleat extending between said rims at the transverse center of said board, plates lying above said pivot bars, and a bee opening in each of the other bottom board rims.

In testimony that I claim the foregoing I have hereunto set my hand.

JOHN E. HAND.

Witnesses:
HELEN S. TRUSCOTT,
W. H. TRUSCOTT.

Copies of this patent may be obtained for five cents each, by addressing the "Commissioner of Patents, Washington, D. C."